United States Patent

Watanabe et al.

[11] Patent Number: 5,920,343
[45] Date of Patent: Jul. 6, 1999

[54] IMAGING SYSTEM WITH IMAGE PROCESSING FOR RE-WRITING A PORTION OF A PIXEL BLOCK

[75] Inventors: Tohru Watanabe, Ogaki; Toshihiro Furusawa; Toshio Nakakuki, both of Gifu-ken, all of Japan

[73] Assignee: Sanyo Electric Company, Ltd., Osaka, Japan

[21] Appl. No.: 08/696,033

[22] Filed: Aug. 9, 1996

[30] Foreign Application Priority Data

Aug. 10, 1995 [JP] Japan ................................ 7-204606

[51] Int. Cl.⁶ .......................... H04N 5/228; H04N 3/16
[52] U.S. Cl. ........................................ 348/222; 348/231
[58] Field of Search .................................. 348/222, 231, 348/716, 718, 714, 708

[56] References Cited

U.S. PATENT DOCUMENTS

| | | | |
|---|---|---|---|
| 5,343,243 | 8/1994 | Maeda | 348/222 |
| 5,428,389 | 6/1995 | Ito | 348/231 |
| 5,444,483 | 8/1995 | Maeda | 348/231 |
| 5,581,310 | 12/1996 | Vinekar et al. | 348/718 |
| 5,585,856 | 12/1996 | Nakaya et al. | 348/441 |
| 5,627,603 | 5/1997 | Sakai | 348/222 |
| 5,740,303 | 4/1998 | Ban | 348/222 |

*Primary Examiner*—Wendy Garber
*Assistant Examiner*—Alicia M. Harrington
*Attorney, Agent, or Firm*—Sheridan Ross P.C.

[57] ABSTRACT

An image sensing apparatus which performs fast data processing without suffering an increased manufacturing cost. The image sensing apparatus senses an object and produces an image data signal screen-by-screen. In one embodiment, an image sensing apparatus for producing an image data signal includes an image sensing unit, a signal processor, a main buffer memory, and an image data processing circuit. A first group of processed pixels having the size of a first matrix is stored in the main buffer memory. The image data processing circuit receives a second group of pixels having the size of a second matrix from the first group stored in the main buffer memory. Included in image data processing circuit is a sub buffer which is initially filled with the second group of pixels. As pixels are processed and removed from the sub buffer, a third group of pixels is provided from the main buffer which is equal in size to a horizontal row or a vertical column from the second group.

8 Claims, 7 Drawing Sheets

Fig. 9A
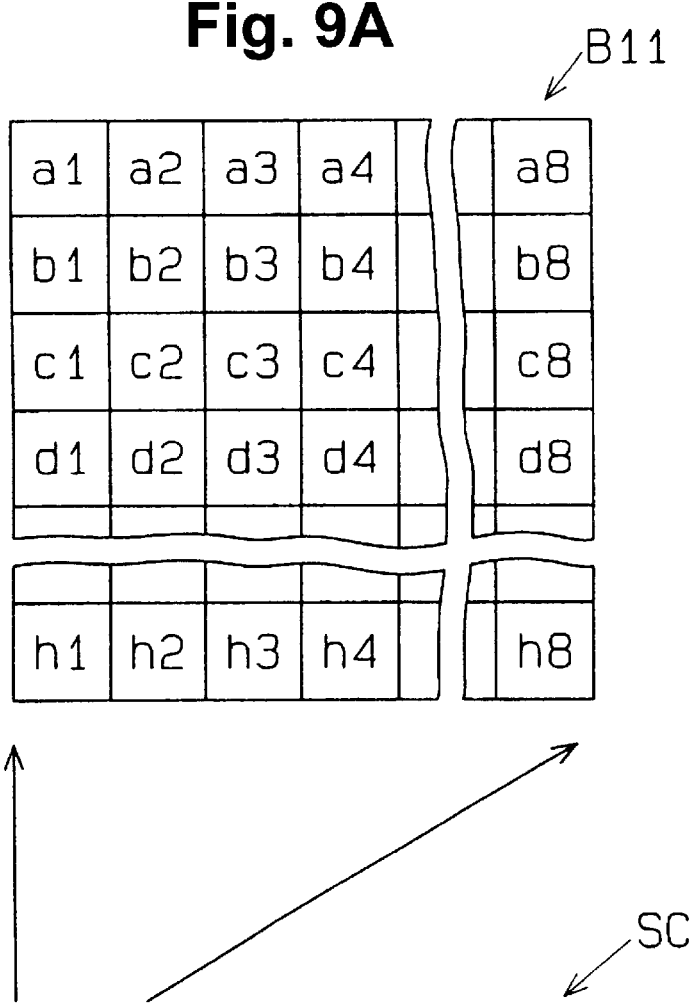
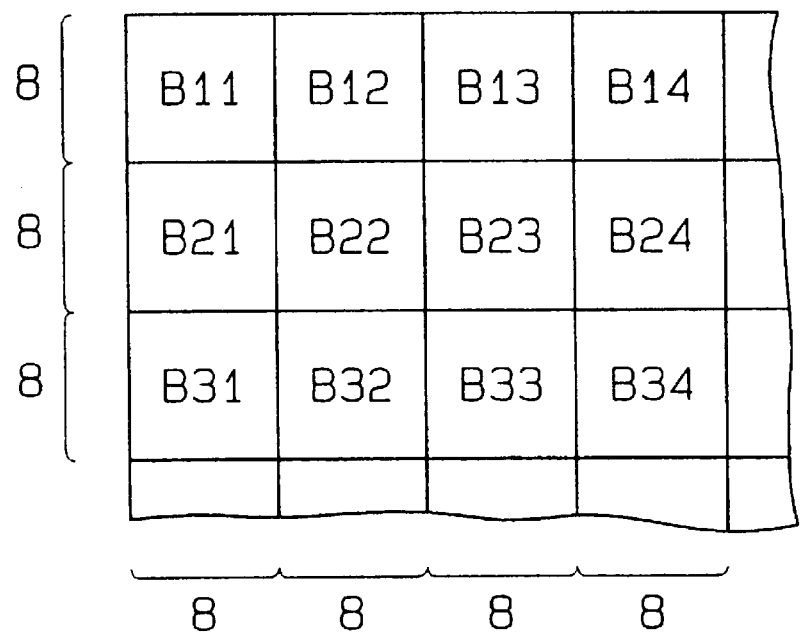
Fig. 9B

IMAGING SYSTEM WITH IMAGE PROCESSING FOR RE-WRITING A PORTION OF A PIXEL BLOCK

BACKGROUND OF THE INVENTION

1. Field of the Invention

The present invention relates generally to an image sensing apparatus which acquires digitized image data through a sensing device. More particularly, the invention relates to an improvement in the speed of processing image data by an image sensing apparatus.

2. Description of the Related Art

Computer systems like personal computers and word processors are typically equipped with an image scanner which scans an original target and reads the target's image information. Recently, it has been proposed to install electronic still cameras into computer systems in order to acquire image information of a three-dimensional object. Electronic still cameras have an image sensing device which generates image signals, and most of them finally supply image information as "digital data" to computer systems through a digitized image signal processor.

FIG. 1 is a block diagram showing an image sensing apparatus (electronic still camera) which is capable of generating one screen of image information in the form of digital data (i.e., image data). The image sensing apparatus comprises a charge couple device (CCD) image sensor 101, a driving circuit 102, a timing controller 103, an analog signal processor 104, an A/D (Analog/Digital) converter 105, and a digital signal processor 106. The CCD image sensor 101 has a light-receiving surface on which a plurality of light-receiving elements are aligned in a matrix form. The individual light-receiving elements produce information charges in response to light irradiated on the light-receiving surface. In this manner, the light-receiving elements store the produced information charges. A color filter having a plurality of specific color components arranged in a mosaic pattern is attached to the front portion of the light-receiving surfaces so that the individual light-receiving elements are associated with the respective color components.

The driving circuit 102 produces a multi-phase clock pulse signal in response to horizontal and vertical scan timing signals received from the timing controller 103, and transmits this clock pulse signal to the CCD image sensor 101. The CCD image sensor 101 sequentially transfers the information charges stored in the individual light-receiving elements to the analog signal processor 104 in a line-by-line manner. At this time, the output section of the CCD image sensor 101 converts the information charges, stored in the individual light-receiving elements, to voltage values in accordance with the level of charge. The CCD image sensor 101 outputs the analog pixel signals having the converted voltage values.

Next, the analog signal processor 104 will perform signal processing, such as a sample and hold operation and gain control on the analog pixel signals (received from the CCD image sensor 101) and supplies the analog pixel signals in a predetermined format to the A/D converter 105. If the CCD image sensor 101 outputs an analog pixel signal having a reference level and a signal level that is alternately repeated, for example, the difference between the reference level and the signal level will be acquired in the sample and hold operation. Under the gain control, the gains of the analog pixel signals may be adjusted in such a way that the average level of one screen of analog pixel signals falls within a predetermined proper range.

The A/D converter 105 is configured to convert the analog pixel signals to digital pixel signals in synchronism with the signal output operation of the CCD image sensor 101. In this manner, A/D converter 105 may supply the digital pixel signals to the digital signal processor 106. By way of example, the digital pixel signals correspond to the respective light-receiving elements of the CCD image sensor 101.

The digital signal processor 106 performs a color-component separation for the digital pixel signals, white balance adjustment and edge enhancement or the like to produce image data which includes luminance information and color difference information. Formally, luminance data Y representing the luminance and two kinds of color difference data U and V respectively, represent the difference between the luminance component and red component, and the difference between the luminance component and blue component. These components are therefore used for processing image data representing a color video image. The image data consisting of three kinds of data Y, U and V is transmitted to the computer system which outputs in the image-information scanning order of the CCD image sensor 101.

The above-discussed image sensing apparatus should face the demand for smaller and lighter apparatuses and reduce the number of components which translates to lower costs. In general, therefore, the analog signal processor 104 and digital signal processor 106 are designed as integrated circuit devices and are arranged together with the CCD image sensor 101 on a single circuit board.

The digital signal processor 106 typically needs memory having a predetermined capacity to temporarily store several lines of light-receiving pixel data. When one line consists of 640 pixels, and pixel data consists of eight bits, for example, the memory should have a capacity of approximately 40 K (640×8×8) bits to store eight lines of pixel data. The memory with such capacity is typically implemented together with the aforementioned digital signal processor on a single chip. Unfortunately, implementing these functions on a single chip will result in an increased need for additional chip area, thus resulting in increased manufacturing costs. Generally, therefore, the digital signal processor 106 and the memory are integrated on separate chips and are interconnected through a circuit board. However, this structure compels both the digital signal processor 106 and the memory to exchange a vast amount of pixel data at high speeds and requires that they have multiple input/output terminals. When 8-bit pixel data for eight pixels are exchanged in parallel, for example, 64 input/output terminals will be needed. This restriction complicates the interconnection structure on the circuit board and increases the power consumed by the operation of input/output buffers provided at the input/output terminals. As can be appreciated, this increases manufacturing cost for the circuit board, and the increased consumption of power shortens the operable time of an electronic still camera which often uses a battery as its power source. It is also possible to serially exchange pixel data between the digital signal processor 106 and the memory. However, as the amount of pixel data increases, the time needed to exchange the pixel data will become longer and the speed at which this exchange takes place will become slower. Consequently, this restricts the arithmetic operation of the digital signal processor 106, resulting in slower data processing.

There has been proposed an electronic still camera equipped with a recording medium, such as a non-volatile semiconductor memory or a magnetic disk, which temporarily stores the obtained image data before supplying the image data to a computer system. A computer equipped with such an electronic still camera can selectively read only necessary image data from the recording medium to process it. To ensure recording of a greater amount of image data, electronic still cameras are equipped with a recording apparatus which records image data on a recording medium after compression.

As shown in FIG. 2, the recording apparatus comprises a raster block converter 107, a encoder/decoder 108 and a data recording circuit 109. The raster block converter 107 converts the order of image data from the digital signal processor 106 to the optimal order for the processing in the encoder/decoder 108. This raster block converter 107 typically has sufficient memory to store several lines of image data, and reads image data from the memory in an order different from the writing order to thereby convert the aligning order of the image data. The raster block converter 107 stores the image data output from the digital signal processor 106 line by line in accordance with the scanning order of the CCD image sensor 101 and supplies the image data to the encoder/decoder 108 block by block which consists of given numbers of rows and columns.

The encoder/decoder 108 produces image data which has been compressed in block units, each unit consisting of a given numbers of rows and columns. In other words, the encoder/decoder 108 collectively stores several lines of image data in the memory and executes compression block by block according to a predetermined algorithm to produce compressed image data.

The encoder/decoder 108 performs decompression of the compressed image data (i.e., processing opposite to the compression) to restore the original image data. The computer system receives the reproduced image data block by block from the encoder/decoder 108. A display device of the computer system receives, line by line, image data whose aligning order has been converted by the raster block converter 107. The data recording circuit 109 is; comprised of a non-volatile semiconductor memory, which records the compressed image data corresponding to a plurality of screens. It is therefore apparent from the above discussion that the implementation of the raster block converter 107 will further increase the manufacturing cost of the image sensing apparatus.

SUMMARY OF THE INVENTION

Broadly speaking, the present invention relates to an image sensing apparatus which performs fast data processing without suffering an increased manufacturing cost. The present invention can be implemented in numerous ways, including as an apparatus and a method.

As an image sensing apparatus for sensing an object and producing image data signal screen by screen, an embodiment of the invention includes: an image sensing unit configured to produce a plurality of pixel data signals for a screen matrix of rows and columns, and sequentially outputting the plurality of pixel data signals row by row in accordance with a predetermined timing; a signal processor for processing the plurality of pixel data signals in accordance with the predetermined timings the signal processor continuously producing a plurality of processed pixel data signals row by row; a main buffer memory, coupled to the signal processor, for storing a first group of processed pixel data signals among the plurality of processed pixel data signals in a first predetermined number of rows, and an image data producing circuit for receiving a second group of processed pixel data signals among the first group of processed pixel data signals from the main buffer memory in a predetermined order and continuously producing image data signal for a single pixel, wherein the second group of processed pixel data signals are in a second predetermined matrix of rows and columns.

As a method of sensing an object and producing image data signal screen by screen, an embodiment of the invention performs the operations of: producing a plurality of pixel data signals for one screen matrix of rows and columns; processing the plurality of pixel data signals to continuously produce a plurality of processed pixel data signals row by row; storing a first group of processed pixel data signals among the plurality of processed pixel data signals in a first predetermined number of rows into a main buffer memory; reading a second group of processed pixel data signals among the first group of processed pixel data signals in a second predetermined matrix with rows and columns from the main buffer memory; and producing image data signals for a single pixel from the second group of processed pixel data signals.

Other aspects and advantages of the invention will become apparent from the following descriptions taken in conjunction with the accompanying drawings, illustrating by way of example the principals of the invention.

BRIEF DESCRIPTION OF THE DRAWINGS

The invention, together with objects and advantages thereof, may best be understood by reference to the following description of the presently preferred embodiments together with the accompanying drawings.

FIG. 9 is a diagram used for explaining one block of image data to be processed in accordance with the JPEG algorithm.

DETAILED DESCRIPTION OF THE PREFERRED EMBODIMENTS

First Embodiment

Figure 1:
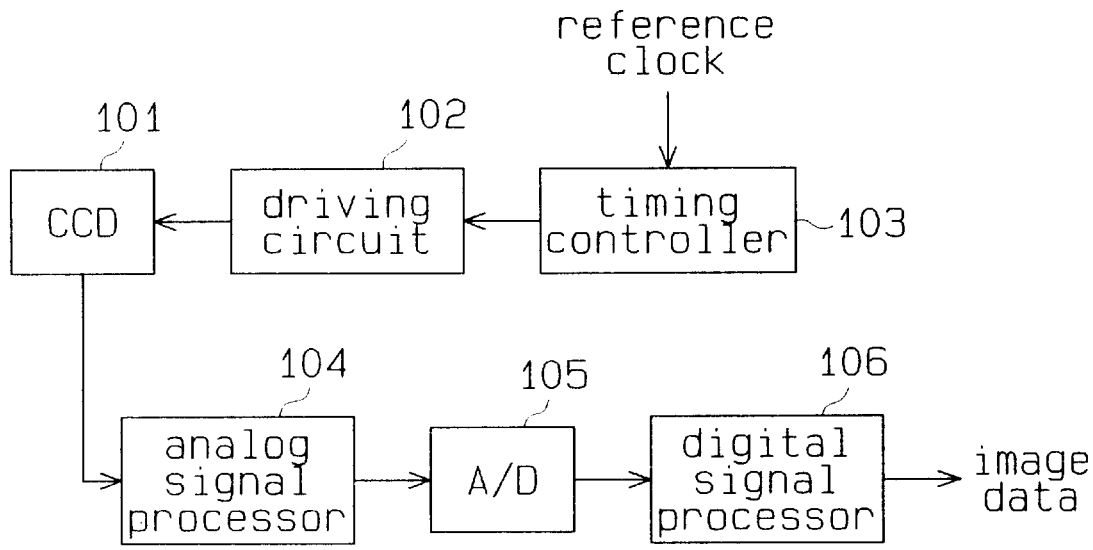
FIG. 1 is a block diagram of a conventional image sensing apparatus.
Figure 2:
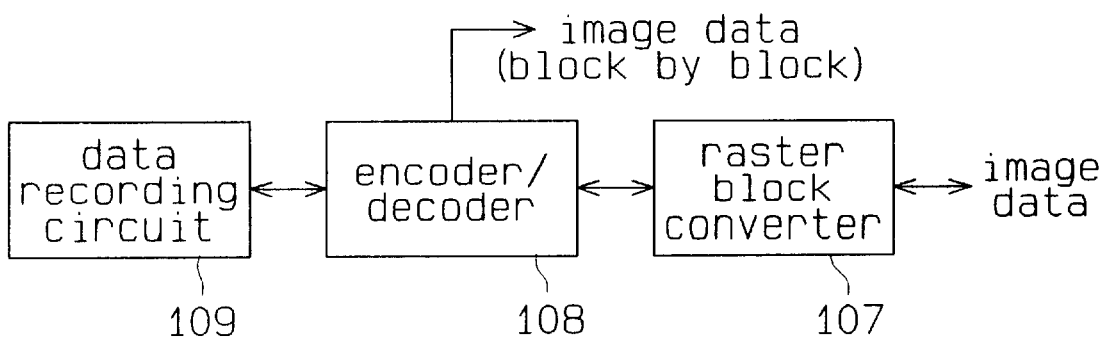
FIG. 2 is a block diagram showing an image data compressing/storing apparatus equipped in the conventional image sensing apparatus.
Figure 3:
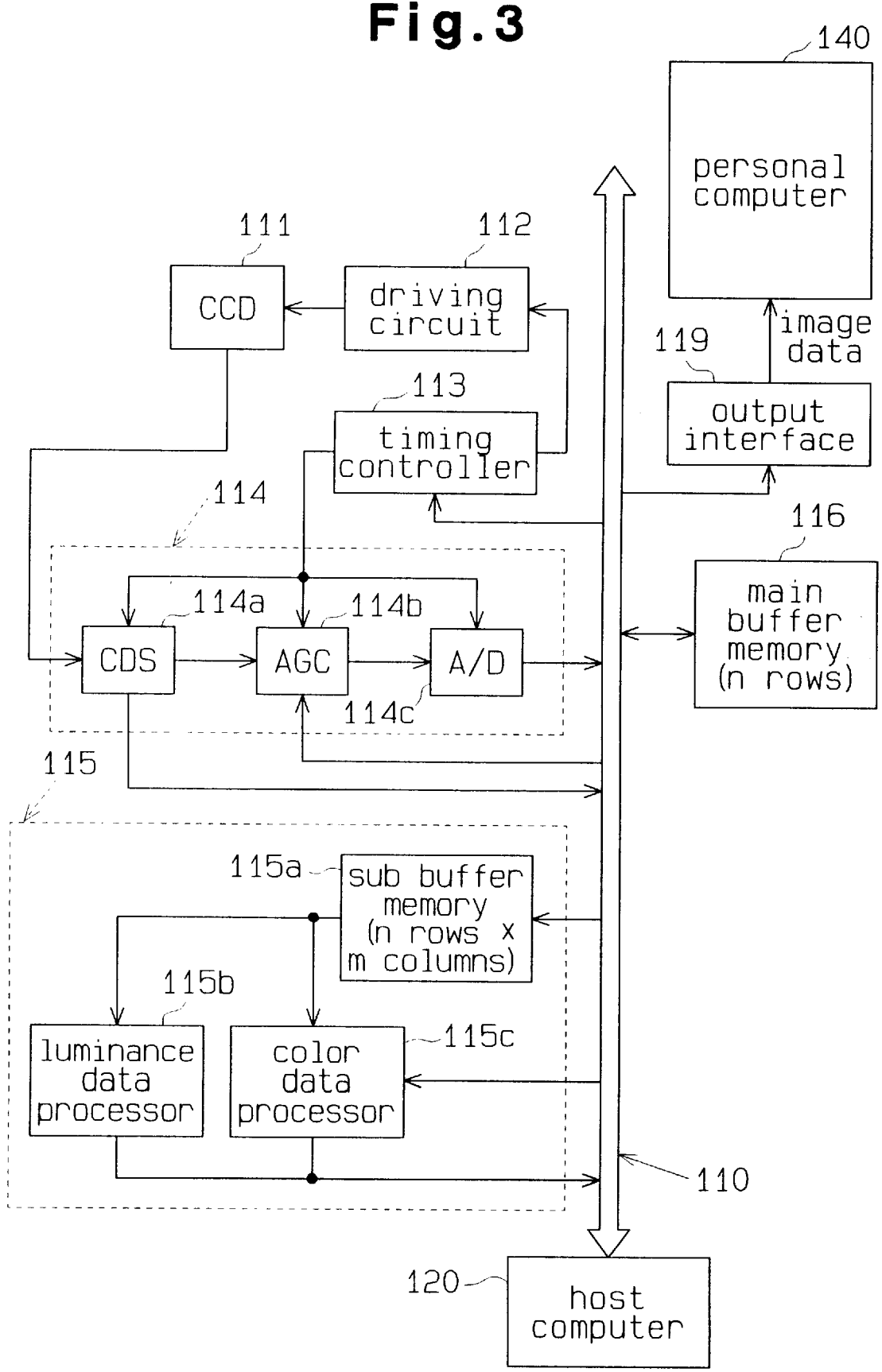
FIG. 3 is a block diagram of an image sensing apparatus according to the first embodiment of the invention.

An image sensing apparatus according to the first embodiment of the present invention will be now described with reference to the accompanying drawings. As shown in FIG. 3, the image sensing apparatus according to the first embodiment comprises a CCD image sensor 111, a driving circuit 112, a timing controller 113, an analog signal processor 114, a digital signal processor 115, a main buffer memory 116, an output interface 119 and a host computer 120. The CCD image sensor 111, the driving circuit 112 and the timing controller 113 constitute an image sensing unit.

The CCD image sensor 111 has a light-receiving surface on which a plurality of light-receiving elements are aligned in a matrix form. The individual light-receiving elements produce information charge in response to the light irradiated on the light-receiving surface and store the produced information charges. A color filter having a plurality of specific color components arranged in a mosaic pattern is attached to the front portion of the light-receiving surface, so that the individual light-receiving elements are associated with respective color components. The timing controller 113 produces timing signals that are synchronized with horizontal and vertical scan periods of the CCD image sensor 111 in accordance with a reference clock signal which has a given period. The timing controller 113 also supplies the timing signals to the analog signal processor 114 and the driving circuit 112. The driving circuit 112 produces a multi-phase clock pulse signal in response to the horizontal and vertical scan timing signals supplied from the timing controller 113, and supplies this clock pulse signal to the CCD image sensor 111.

The CCD image sensor 111 operates at a predetermined timing in response to the clock pulse signal and sequentially transfers analog pixel signals (corresponding to the information charges stored in the individual light-receiving elements) to the analog signal processor 114 line by line. Specifically, the CCD image sensor 111 has an output section which converts the analog pixel signals to voltage values (according to the level of information charges, stored in the individual light-receiving elements and associated with the individual color components), and supplies the analog pixel signals containing the converted voltage values to the analog signal processor 114.

The analog signal processor 114 has a correlation double sampling (CDS) circuit 114a, an automatic gain controller (AGC) 114b and an analog/digital (A/D) converter 114c, which operate in synchronism with the timing signals received from the timing controller 113.

The CDS circuit 114a receives an analog pixel signal from the CCD image sensor 111 in accordance with a predetermined clock period. This analog pixel signal has a reference level and a signal level which are alternately repeated. The CDS circuit 114a then samples the reference level and signal level from the analog pixel signal in accordance with a predetermined clock periods and supplies a signal having the difference between the reference level and signal level as a sampled and held analog pixel. signal to the AGC 114b. The resultant analog pixel signal retains the voltage level in accordance with the level of information charges stored in each pixel. Preferably, the voltage level is only retained for one clock period.

The AGC 114b gives a predetermined gain to the sampled and held analog pixel signal such that the average level of the analog pixel signals in each vertical scan period becomes approximately uniform. The predetermined gain will preferably correspond to the average level in one or more vertical scan period. Specifically, the host computer 120 receives the analog pixel signal output from the CDS circuit 114a and produces a control data signal corresponding to the integral value over one vertical scan pe:riod. This control data signal is supplied to the AGC 114b, which in turn variably sets the gain for each vertical scan period in accordance with the control data signal. To set the integral value of the analog pixel signal to a predetermined ranges feedback control is performed. The A/D converter 114c converts the gain-controlled analog pixel signal from the AGC 114b to a digital pixel signal and sends one line of digital pixel data (as one unit) onto a bus line 110.

The main buffer memory 116 connects to the bus line 110 to sequentially receive one line of digital pixel data from the A/D converter 114c, and stores n lines of digital pixel data. The main buffer memory 116 corresponds to a sub buffer memory 115a of the digital signal processor 115 which will be discussed below, and has a memory capacity for storing about the same number of lines of pixel data as the sub buffer memory 115a or greater lines of pixel data. Given that one line consists of 640 pixels and each pixel data consists of eight bits, the main buffer memory 116 which stores five lines of pixel data has an approximate capacity of 25600 (640×8×5) bits or greater.

The digital signal processor 115 has a luminance data processor 115b and a color data processor 115c in addition to the sub buffer memory 115a. Preferably, the sub buffer memory 115a which has a predetermined capacity receives and stores a digital pixel data block for n rows x m columns received from the main buffer memory 116 via the bus line 110. In this embodiments the pixel data block is required to allow the luminance data processor 115b and the color data processor 115c to process one pixel data. It should be understood that if the luminance data processor 115b includes a digital filter function, for example, a pixel data block including 5 rows×5 columns will be required. This is because two rows (upper and lower rows) of pixel data and two columns (right and left columns) of pixel data surrounding the pixel data located at the center of the 5 rows×5 columns of pixels are used to perform digital filtering of the center pixel data. In this case, the sub buffer memory 115a needs a capacity for 200 (8×5×5) bits to store 5 rows×5 columns of pixel data The luminance data processor 115b receives a pixel data block for n rows×m columns and performs digital filtering of that pixel data block. In the digital filtering process, the average for plural pieces of pixel data located above and below and on the right and left of the center pixel in the pixel block is acquired to yield center pixel data The center pixel data in a pixel data block for five (5) rows×five (5) columns, for example, is acquired by obtaining the average of two rows (upper and lower rows) of pixel data and two columns (right and left columns) of pixel data surrounding the pixel located at the center of the pixel data block. Accordingly, the high-frequency noise included in the pixel data is removed and contour enhancement is performed so that a specific frequency component is selectively extracted from the pixel data. After the digital filtering is performed, the luminance data processor 115b produces luminance data Y for a single pixel from the pixel data block for n rows×m columns. The luminance data Y is produced by combining pixel data representing associated color components at a predetermined ratio, and is then sent onto the bus line 110.

The color data processor 115c receives the pixel data block from the sub buffer memory 115a and the luminance data Y via the bus line 110. The color data processor 115c performs a matrix operation on pixel data which represents the individual color components in the pixel data blocks to produce color difference data (U and V). The color difference data U corresponds to a color difference signal R-Y representing the difference between the luminance data and the red component, and the color difference data U corresponds to a color difference signal B-Y representing the difference between the luminance data and the blue component. For examples the color filter, which has yellow Ye, green G and cyan Cy is mounted on the light-receiving surface of the CCD image sensor 111, and permits the generation of the red component R from Ye-G and the blue component B from Cy-G. As the luminance data Y is subtracted from the red and blue components R and B, the color difference data U and V are obtained. At this point, the color difference data U and V produced in this manner are sent together with the luminance data Y to the bus line 110 as pixel data. The output interface 119 receives the image data (color difference data U and V and luminance data Y) sent on the bus line 110, and supplies the pixel data to a personal computer 140.

The following is a description of the operation of the main buffer memory 116 in the case where the luminance data processor 115b and the color data processor 115c perform arithmetic operations for each pixel block of 5 rows×5 columns of pixel data. In this embodiment, the CCD image sensor 111 is used to acquire one screen of still pictures consisting of 400 rows×640 columns of pixels, and intermittently outputs information charges stored over a predetermined exposure period in a row-by-row format. The following operations are entirely controlled by the host computer 120.

Figure 4A:
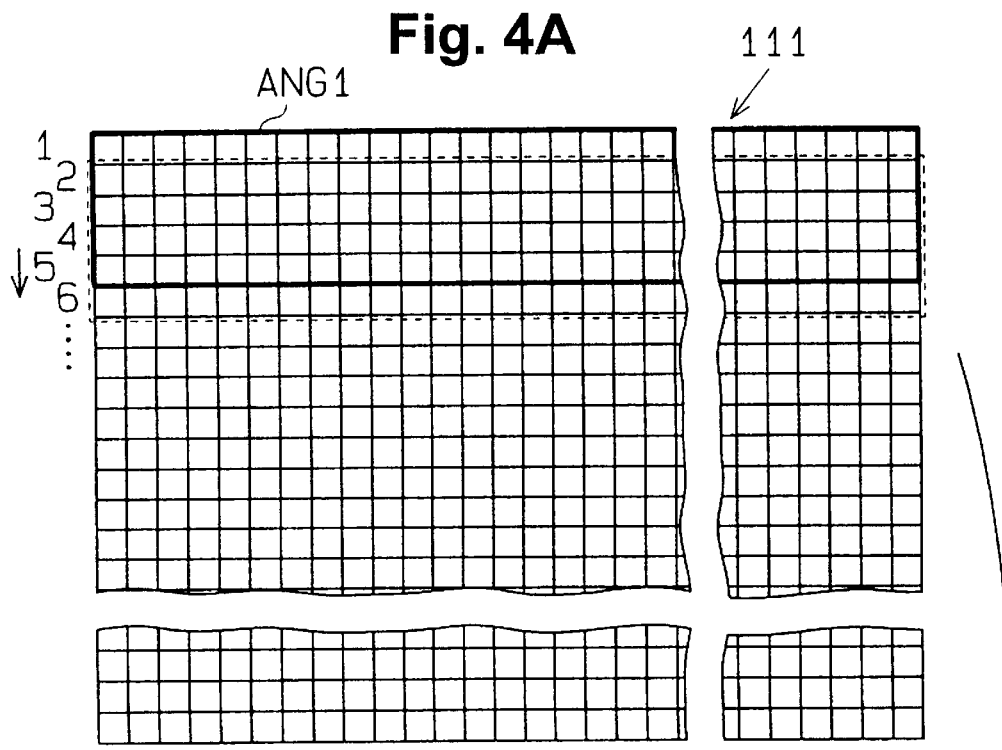
FIG. 4 is a diagram illustrating the processing order for pixel data stored in a main buffer memory of the image sensing apparatus according to the first embodiment.
Figure 4B:
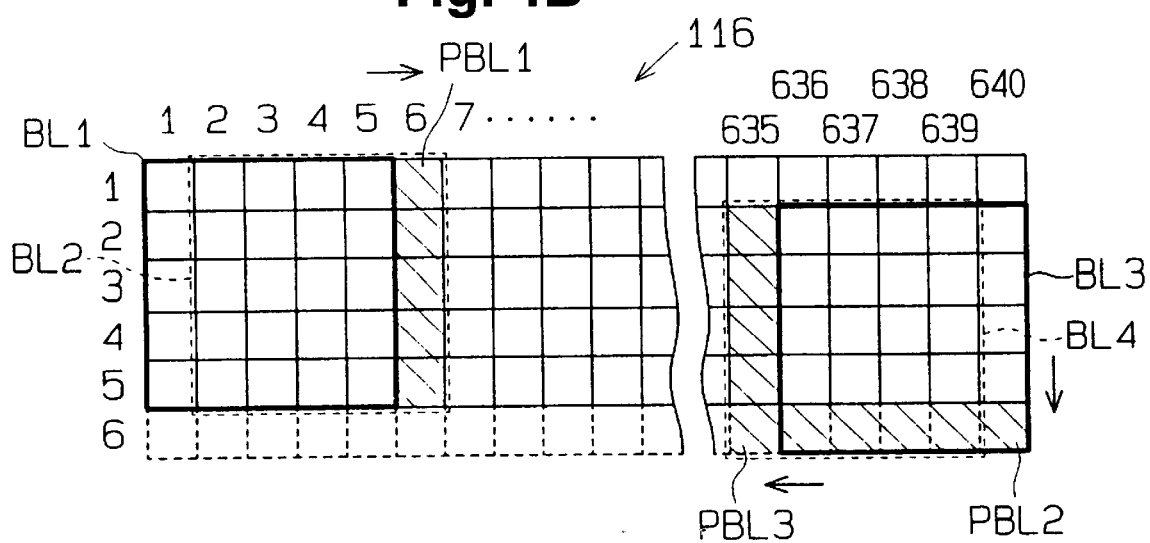

As shown in FIG. 4, first, analog pixel data signals ANG1 for 5 (first to fifth) rows×640 (first to 640th) columns are continuously supplied to the analog signal processor 114 from the CCD image sensor 111. The analog signal processor 114 processes the analog pixel data signals ANG1 and continuously stores digital pixel signals for 5 rows×640 columns to the main buffer memory 116 via the bus line 110. Then, pixel data in a digital pixel data block BL1 (indicated by the thick solid-line screen in FIG. 4) of 5 rows×5 (first to fifth) columns among 5 rows×640 columns of digital pixel data are sequentially read from the main buffer memory 116, and are written in the sub buffer memory 115a in the digital signal processor 115. The luminance data processor 115b and the color data processor 115c read the pixel data block BL1 of 5 rows×5 columns from the sub buffer memory 115a and perform various arithmetic operations thereon. The luminance data Y and color difference data U and V for the pixel at the first row and first column are produced through this process.

After the process is completed, five pieces of analog pixel data PBL1 of 5 (first to fifth) rows×1 (sixth) column are read from the main buffer memory 116 and are written in the sub buffer memory 115a. The sub buffer memory 115a rewrites the five pieces of image data of 5 (first to fifth) rows×1 (first) column with newly supplied five pieces of image data of 5 (first to fifth) rows×1 (sixth) column. Therefore, a pixel data block BL2 (indicated by the broken-line screen in FIG. 4) of 5 (first to fifth) rows×5 (second to sixth) columns is stored in the sub buffer memory 115a. The luminance data processor 115b and the color data processor 115c repeatedly perform the arithmetic operation on the pixel data block BL2 to produce the luminance data Y and the color difference data U and V for the pixel at the first row and the second column.

Thereafter five pieces of pixel data in each column from the seventh column to the last (640th) column are sequentially read from the main buffer memory 116 and written in the sub buffer memory 15a in the same manner. The luminance data processor 115b and the color data processor 115c repeatedly perform the arithmetic operation to produce the luminance data Y and the color difference data U and V. This is performed for individual pixels for one row starting at the first row and first column, and ending at the first row and 640th column. While the operation for producing one row of image data (luminance data Y and color difference data U and V) is being performed, the CCD image sensor 111 is not functioning and the analog signal processor 114 remains in a standby mode.

After the arithmetic operation for one row is completed, the CCD image sensor 111 resumes functioning to output analog pixel signals of 1 (sixth) row×640 columns. In response to this output, the analog signal processor 114 produces digital pixel data of 1 (sixth) row×640 column and newly writes the data in the main buffer memory 116. The main buffer memory 116 rewrites the pixel data of first row×640 column with the pixel data of sixth row×640 column. At this time, a pixel data block of 5 (first to fifth) rows×5 (636th to 640th) columns have been stored in the sub buffer memory 115a.

After the rewriting of pixel data has been completed, five pieces of pixel data PBL2 of 1 (sixth) row×5 (636th to 640th) columns are read from the main buffer memory 116 and are written in the sub buffer memory 115a. At this times the sub buffer memory 115a rewrites the five pieces of pixel data of 1 (first) row×5 (636th to 640th) columns with the five pieces of pixel data PBL2 of 1 (sixth) row×5 (636th to 640th) columns. Accordingly, a pixel data block BL3 (indicated by the black thick-line screen in FIG. 4) of 5 (second to sixth) rows×5 (636th to 640th) columns is stored in the sub buffer memory 115a. The luminance data processor 115b and the color data processor 115c repeatedly perform signal processing on the pixel data block BL3 to produce the luminance data Y and the color difference data U and V for the pixel at the second row and the 640th column.

Subsequently, five pieces of pixel data PBL3 of 5 (second to sixth) rows×1 (635th) column are read from the main is buffer memory 116 and written in the sub buffer memory 115a in the same manner. The sub buffer memory 115a rewrites the five pieces of pixel data of 5 (second to sixth) rows×1 (640th) column with the five pieces of pixel data PBL3 of 5 (second to sixth) rows×1 (635th) column. Accordingly, a pixel data block BL4 (indicated by the broken-line screen in FIG. 4) of 5 (second to sixth) rows×5 (635th to 639th) columns is stored in the sub buffer memory 115a. The luminance data processor 115b and the color data processor 115c perform signal processing to produce the luminance data Y and the color difference data U and V for the pixel at the second row and the 639th column.

Thereafter, five pieces of pixel data in each column from the 634th column to the first column are read from the main buffer memory 116 and written in the sub buffer memory 115a column by column. The luminance data processor 115b and the color data processor 115c repeatedly perform signal processing to produce the luminance data Y and the color difference data U and V for the individual pixels for one row starting at the second row and the 640th column and continuing to the second row and the first column. As apparent from the above, the image data (luminance data Y and color difference data U and V) for the individual pixels in the second row are acquired in order from the one at the last column to the one at the first column. For the individual pixels from the third row on, the same processing is performed as previously completed for the first row on those of odd-numbered rows and the same processing is performed as previously completed for the second row on those of even-numbered rows. It should be appreciated that the shifting of rows in this manner facilitates the rewriting of pixel data to be stored in the sub buffer memory 115a. In other words, a small amount of pixel data needs to be read from the main buffer memory 116 and written into the sub buffer memory 115a. This feature permits fast transfer of pixel data from the main buffer memory 116 to the sub buffer memory 115a. In this manner, the digital signal processor 115 or the image sensing apparatus attains increased processing speeds. Further, an advantageous cost reduction is realized by separately implementing the digital signal processor 115 and the main buffer memory 116b.

Second Embodiment

An image sensing apparatus equipped with a pixel data compressing function will now be discussed with reference to the accompanying drawings. To avoid a redundant description, like or same reference numerals are given to those components which are the same as the corresponding components of the first embodiment.

Figure 5:
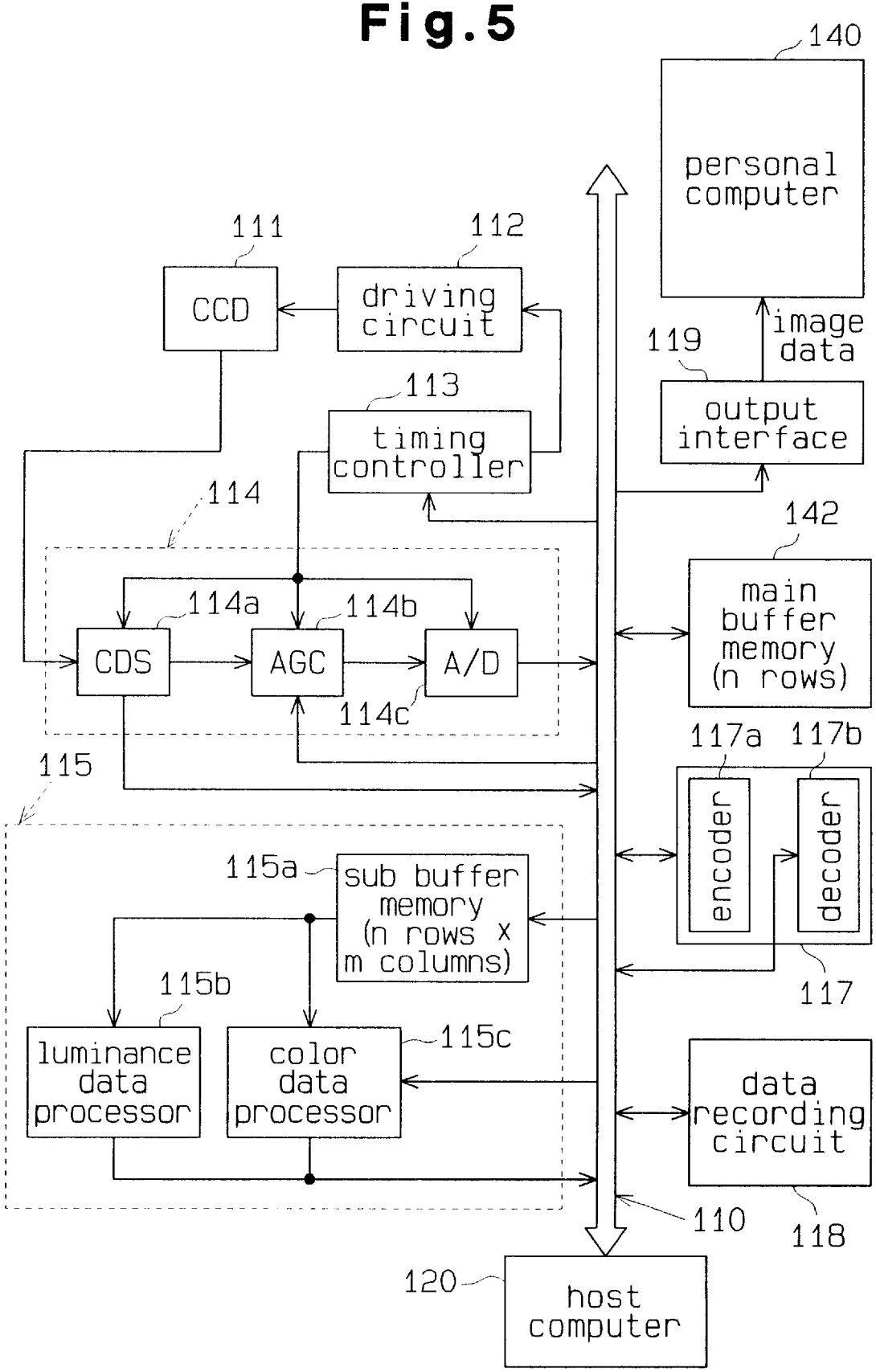
FIG. 5 is a block diagram of an image sensing apparatus according to the second embodiment of the invention.

As shown in FIG. 5, the image sensing apparatus according to the second embodiment comprises a CCD image sensor 111, a driving circuit 112, a timing controller 113, an analog signal processor 114, a digital signal processor 115, a main buffer memory 142, a encoder/decoder 117, a data recording circuit 118, a n output interface 119 and a host computer 120.

The encoder/decoder 117 has an encoder 117a and a decoder 117b. The encoder 117a receives a block of image data (luminance data Y and color difference data U and V) associated with a pixel block of a predetermined number of rows and columns from the luminance data processor 115b and the color data processor 115c via a bus line 110, and compresses the received data block. The compressed data is stored in the data recording circuit 118 via the bus line 110. The decoder 117b reads compressed data from the data recording circuit 118 and performs decompression (reproduction), which is processing opposite that of the compression, to reproduce image data consisting of the original luminance data Y and color difference data U and V. The reproduced image data is then sent onto the bus line 110. The compression and decompression are executed according to, for example, a JPEG algorithm that has been standardized by JPEG (Joint Photographic Experts Group). The output interface 119 receives the reproduced image data from the decoder 117b via the bus line 110 and then supplies it to a personal computer 140.

The data recording circuit 118, which is comprised of a well-known recording medium such as a non-volatile semiconductor memory or a magnetic disk, records compressed image data for a plurality of screens. For example, one screen typically consists of a plurality of pixels in a matrix of 400 rows×640 columns. When image data (luminance data Y and color difference data U and V) associated with each pixel consists of 24 (8×3) bits, one screen of image data will consist of approximately 6 mega (400×640×24) bits. When this image data is compressed to about 1/20, the compressed data will then consist of about 3 Kbits. Therefore, the data recording circuit 118 having a memory capacity of, for example, 4 Mbits is capable of recording compressed image data for about thirteen (13) screens.

Figure 6:
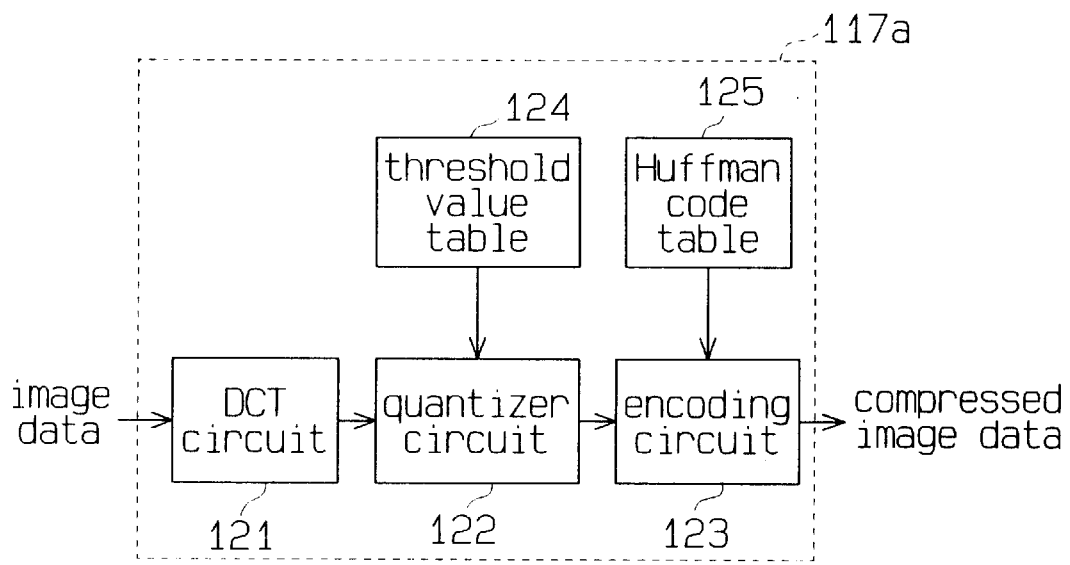
FIG. 6 is a block diagram showing an encoder implementing a JPEG algorithm installed in the image sensing apparatus according to the second embodiment.

As shown in FIG. 6, the encoder (JPEG encoder) 117a which compresses image data according to the JPEG algorithm has a DCT (Discrete Cosine Transform) circuit 121, a quantizer 122, an encoding circuit 123, a threshold value table 124 and a Huffman code table 125.

The encoding system which uses the JPEG algorithm separates one screen (or frame) FL into a plurality of blocks B11 to Bij (each of 8×8 pixels), as shown in FIG. 9, and executes the encoding operation block by block. Data compression is typically performed by encoding a unit of 64 pieces of image data associated with pixels a1 through h8 of 8 rows×8 columns, which constitute each of the blocks B11 through Bij.

The DCT circuit 121 will typically receive one block (64 pixels) of image data from the luminance data processor 115b and color data processor 115c and perform a two-dimensional DCT operation to produce 64 pieces of DCT coefficient data. The quantizer 122 then receives the DCT coefficient data from the DCT circuit 121 and quantizes the data by referring to the threshold values stored in the threshold value table 124 to thereby yield quantized DCT coefficient data. In the second embodiment, the threshold values determine what the image data compression ratios are and the quality of a reproduced image. Further, the threshold values are arbitrarily set in accordance with the purpose of the apparatus having the encoder 117a.

The encoding circuit 123 performs variable length coding of the quantized DCT coefficient data in accordance with Huffman codes stored in the Huffman code table 125, thus yielding compressed image data. The Huffman codes are variable length codes assigned in accordance with the expected frequency that the quantized DCT coefficient data will appear; a short code is assigned to data having a high frequency of appearance. Through coding by the encoder 117a, the amount of image data is compressed from between about 1/5 and 1/40.

Figure 7:
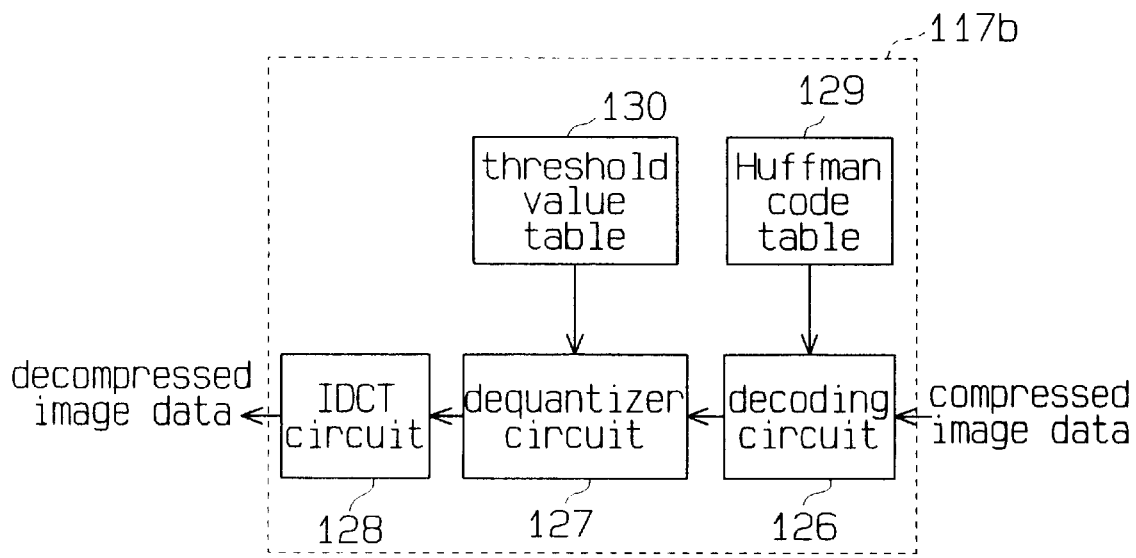
FIG. 7 is a block diagram showing a decoder implementing a JPEG algorithm installed in the image sensing apparatus according to the second embodiment.

As shown in FIG. 7, the decoder (JPEG decoder) 117b which decompresses (reproduces) compressed image data according to the JPEG algorithm has a decoding circuit 126, an inverse quantizer 127, an IDCT (Inverse Discrete Cosine Transform) circuit 128, a Huffman code table 129 and a threshold value table 130.

The decoding circuit 126 receives one block (8×8 pixels) of compressed image data from the data recording circuit 118 and performs variable length decoding, the opposite process performed by the encoding circuit 123, in accordance with Huffman codes stored in the Huffman code table 129. In this variable length decoding process, the DCT coefficient data quantized by the encoder 117a is reproduced. The Huffman codes in the Huffman code table 129 are associated with those in the Huffman code table 125 of the encoder 117a.

The dequantizer 127 receives the quantized coefficient data from the decoding circuit 127 and performs dequantization, the opposite process to that performed by the quantizer 122, while referring to the threshold values stored in the threshold value table 130, thereby reproducing DCT coefficient data. The threshold values stored in the threshold value table 130 are associated with those in the threshold value table 125 of the encoder 117a.

The IDCT circuit 128 receives the DCT coefficient data from the dequantizer 127 and performs IDCT to reproduce decompressed image data. The IDCT circuit 128 performs the transform process of DCT coefficient data associated with one block (8×8 pixels) of image data at a time, and continuously supplies the reproduced image data, pixel by pixel, to the output interface 119 in a predetermined order. In this embodiment, the encoder (JPEG encoder) 117a and decoder (JPEG decoder) 117b in the second embodiment are comprised of a single digital signal processor (DSP). By way of example, one type of suitable processor is a high-performance arithmetic and logic unit which has common circuits.

The second embodiment executes raster block conversion at the stage where image data is transferred to the sub buffer memory 115a from the main buffer memory 142 so that the encoder 117a can process image data block by block (8×8 pixels). The analog signal processor 114 outputs image data row by row, whereas the encoder/decoder 117 processes image data block by block. Therefore, the raster block conversion for converting the alignment order of image data becomes necessary during the process of outputting image data from the analog signal processor 114 to the reception of the image data by the encoder/decoder 117.

Figure 8A:
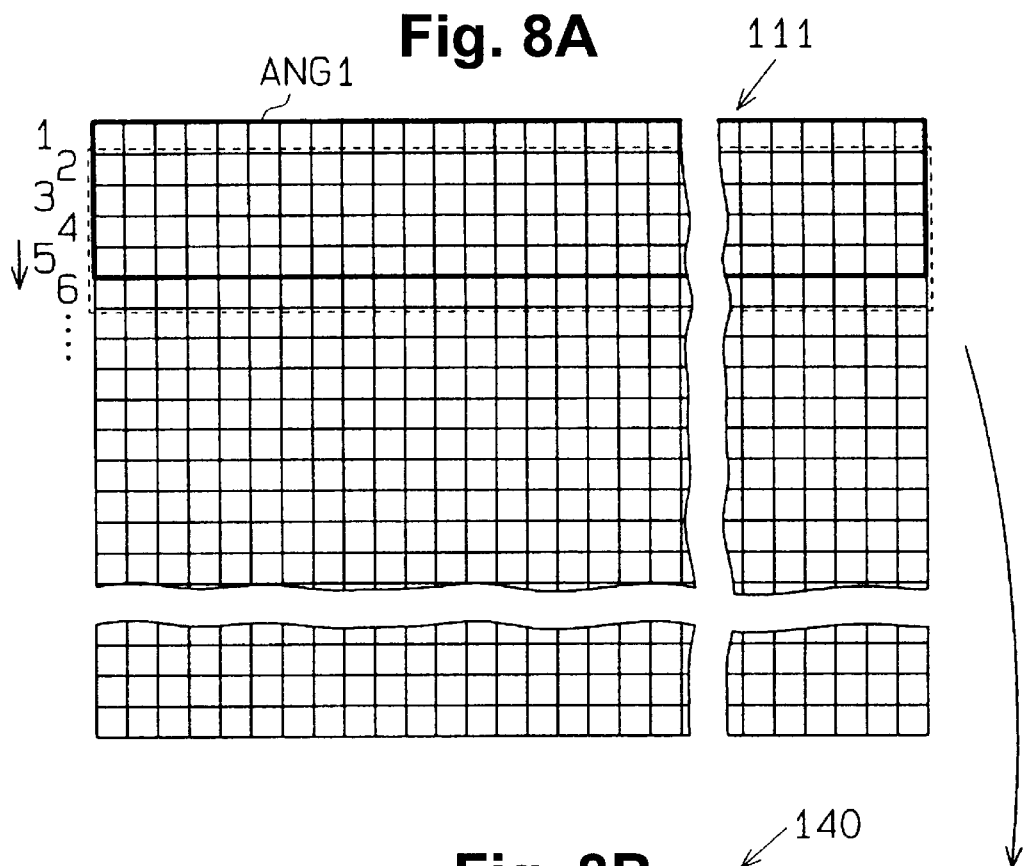
FIG. 8 is a diagram illustrating the processing order for pixel data stored in a main buffer memory of the image sensing apparatus according to the second embodiment.
Figure 8B:
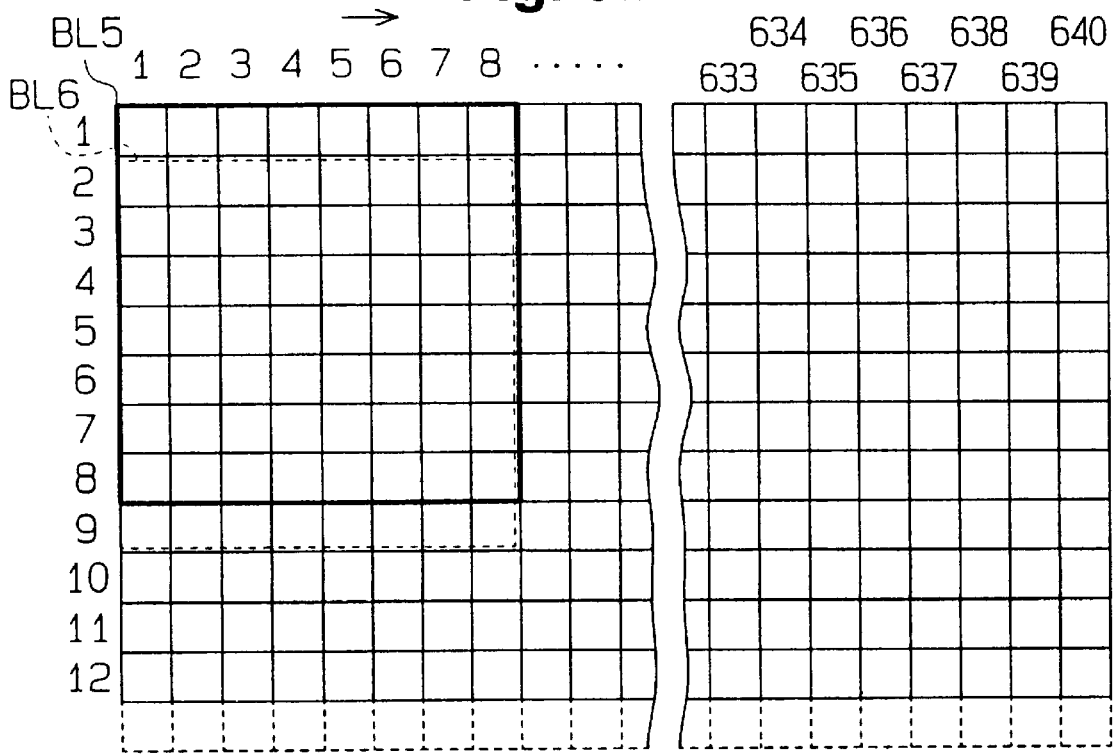

For this raster block conversion, the main buffer memory 142 has a capacity suitable to store pixel data of the same number of rows (5 rows) as is stored in the sub buffer memory 115a or a greater number of rows. Further, the main buffer memory will have sufficient capacity to store image data of the same number of rows (8 rows) of one block of image data as is processed in the encoder/decoder 117 or a greater number of rows. In cases where the digital signal processor 115 processes pixel data in units of 5 rows×5 columns and the encoder/decoder 117 processes image data in units of 8 rows×8 columns, for example, the main buffer memory 142 will preferably have the capacity to store 12 rows of pixel data, as shown in FIG. 8.

In this embodiment, the sub buffer memory 115a will preferably receive a pixel data block of 8 rows×8 columns from the main buffer memory 142 so that the luminance data processor 115b and the color data processor 115c can produce image data of 8 rows×8 columns. To produce image data a1 in the image data block B11 shown in FIG. 9, for example, a pixel data block BL5 consisting of 8 (first to eighth) rows×8 (first to eighth) columns is stored in the sub buffer memory 115a. Further, to produce image data a8 in the image data block B11, a pixel data block BL6 consisting of 8 (second to ninth) rows×8 (first to eighth) columns is stored in the sub buffer memory 115a. As pixel data blocks are stored in the sub buffer memory 115a in this manner, raster block conversions are carried out. This raster block conversion permits the digital signal processor 115 to process pixel data in an order that matches the processed order of image data in the encoder/decoder 117. The image sensing apparatus according to the second embodiment, which executes raster block conversion using the main buffer memory 142 advantageously eliminates the need for an exclusive memory for the raster block conversion, thus reducing the manufacturing cost of an image sensing apparatus.

Although only two embodiments of the present invention have been described herein, it should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. An image sensing apparatus for sensing an object and producing image data signal screen by screen, comprising:
   an image sensing unit configured to produce a plurality of pixel data signals for a screen matrix of rows and columns, and sequentially outputting said plurality of pixel data signals row by row in accordance with a predetermined timing;
   a signal processor for processing said plurality of pixel data signals in accordance with said predetermined timing, said signal processor continuously producing a plurality of processed pixel data signals row by row;
   a main buffer memory, coupled to said signal processor, for storing a first group of processed pixel data signals among said plurality of processed pixel data signals in a first matrix of a first predetermined number of rows; and
   an image data producing circuit for receiving a first share of said first group of processed pixel data signals from said main buffer memory in a predetermined order and continuously producing image data signal for a single pixel, wherein:
      said first share of processed pixel data signals is in a second matrix of the first predetermined number of rows and a second predetermined number of columns;
      said image data producing circuit includes a sub buffer memory for primarily storing said first share of processed pixel data signals in said second matrix and secondarily storing a second share of said first group of processed pixel data signals in said second matrix after producing said image data signal;
      said second share of processed pixel data signals includes a portion of said first share of processed pixel data signals except for one of:
         a vertical matrix of said first predetermined number of rows and one column in said first share, and
         a horizontal matrix of one row and said second predetermined number of columns in said first share.

2. An image sensing apparatus according to claim 1, wherein said image data producing circuit performs one of following rewriting operations:
   rewriting said vertical matrix in said first share with a new vertical matrix to store said second share in said sub buffer; and
   rewriting said horizontal matrix in said first share with a new horizontal matrix to store said second share in said sub buffer.

3. The image sensing apparatus according to claim 1, further comprising an encoder coupled to said pixel data producing circuit, said encoder configured to receive a second group of image data signals in a third predetermined number of rows and columns as one block signal and to encode said second group of image data signals to produce encoded image data signals, and
   wherein said sub buffer memory stores said second group of processed pixel data signals from said main buffer memory in the third predetermined number of rows and columns, and said image data producing circuit produces and supplies said second group of image data signals to said encoder.

4. A method of sensing an object and producing image data signals screen by screen, comprising the steps of:
   producing said plurality of pixel data signals to continuously produce a plurality of processed pixel data signals row by row;
   storing a first group of processed pixel data signals among said plurality of processed pixel data signals in a first matrix of a first predetermined number of rows into a main buffer memory;
   reading a first share of processed pixel data signals among said first group of processed pixel data signals in a second matrix a first predetermined number of rows and a second predetermined number of columns from said main buffer memory;
   primarily storing said first share of processed pixel data signals in the second matrix into a sub buffer memory;

producing image data signal for a single pixel from said first share of processed pixel data signals;

secondarily storing a second share of said first group of processed pixel data signals in said second matrix into said sub buffer memory; and producing image data signal for a single pixel from said second share of processed pixel data signals, wherein:
said second share of processed pixel data signals includes a portion of said first share of processed pixel data signals except for one of:
a vertical matrix of said first predetermined number of rows and one column in said first share, and
a horizontal matrix of one row and said second predetermined number of columns in said first share.

5. The method according to claim 4, wherein said secondarily storing step includes one of following steps:

rewriting said vertical matrix in said first share with a new vertical matrix to store said second share; and rewriting said horizontal matrix in said first share with a new horizontal matrix to store said second shared.

6. The method according to claim 4, further comprising the steps of:

receiving a second group of image data signals in a third predetermined number of rows and columns as one block signal;

encoding said second group of image data signals to produce encoded image data signals, and wherein said reading step includes the step of reading said second group of processed pixel data signals in the third predetermined number of rows and columns from said main buffer memory, and wherein said storing step includes the steps of storing said second group of processed pixel data signals into said sub buffer memory.

7. A method of sensing an object and producing image data signals screen by screen, comprising the steps of:

producing said plurality of pixel data signals to continuously produce a plurality of processed pixel data signals row by row;

storing a first group of processed pixel data signals among said plurality of processed pixel data signals in a first matrix of a first predetermined number of rows into a main buffer memory;

reading a second group of processed pixel data signals among said first group of processed pixel data signals in a second matrix with a second predetermined number of rows and a second predetermined number of columns from said main buffer memory;

producing image data signal for a single pixel from said second group of processed pixel data signals;

storing said second group of processed pixel data signals in the second matrix into a sub buffer memory;

storing a third group of processed pixel data signals into said sub buffer memory, wherein said third group includes at least one of:
a horizontal matrix of one row and at least a portion of said second predetermined number of columns, and
a vertical matrix of at least a portion of said second predetermined number of rows and one column.

8. The method of claim 7, further including the steps of:

storing said second group of processed pixel data in said sub buffer, storing a plurality of said vertical matrixes in said sub buffer in a first horizontal direction, thirdly storing said horizontal matrix in said sub buffer, and fourthly storing a plurality of said vertical matrixes in said sub buffer in a second horizontal direction.

* * * * *